United States Patent Office 2,902,488
Patented Sept. 1, 1959

2,902,488
PROCESS FOR THE PRODUCTION OF MELAMINE

Harry Edward Jackson and Basil McDonnell, Rossland, British Columbia, Canada, assignors to The Consolidated Mining and Smelting Company of Canada Limited, Montreal, Quebec, Canada, a corporation of Canada No Drawing. Application August 1, 1956
Serial No. 601,357

7 Claims. (Cl. 260—249.7)

This invention relates to the production of melamine. It is particularly directed to an improved process for the production of melamine in which a compound which contains an element of the group phosphorus, arsenic and antimony is employed as a catalyst in the melamine forming reaction.

Melamine is a white crystalline compound having the formula $C_3N_6H_6$. It can be produced on a commercial scale by reacting one of the groups urea, ammonium sulphamate and ammonia; or urea, sulphur dioxide and ammonia; or guanidine sulphamate and ammonia; or mixtures or combinations thereof at elevated temperature and under a superatmospheric pressure of ammonia. The overall reactions involved in producing melamine by the above groups of reactants may be expressed by the following equations:

$$3CO(NH_2)_2 + 3NH_4SO_3NH_2 \rightarrow C_3N_6H_6 + 3(NH_4)_2SO_4 \quad (1)$$

$$6CO(NH_2)_2 + 9SO_2 + 12NH_3 \rightarrow 2C_3N_6H_6 + 6(NH_4)_2SO_4 + 3S \quad (2)$$

$$3HNC(NH_2)_2HSO_3NH_2 \rightarrow C_3N_6H_6 + 3NH_4SO_3NH_2 \quad (3)$$

Guanidine sulphamate is employed as an initial reactant in Reaction 3. Also, it may be formed during the course of Reactions 1 and 2 and some, not having been converted to melamine, may be present in the reaction product. Guanidine sulphamate present in the reaction product can be withdrawn from the process for subsequent treatment, if desired, or it can be recycled to the reaction chamber as an addition to the initial reactants. The addition of guanidine sulphamate to the other reactants employed in Reactions 1 and 2 facilitates the continuous operation of the process as the salt is molten and quite fluid at reaction temperatures and acts as a liquid carrier for the solid material in the reaction product.

A superatmospheric pressure of ammonia is employed in the production of melamine from reactions illustrated by Equations 1, 2 and 3. The pressure of ammonia may vary from about 200 to about 1,000 pounds per square inch and, preferably, is at least about 500 pounds per square inch. The ammonia is provided by adding it to the initial reactants. In conducting the reaction illustrated by Equation 2, ammonia is added in excess of the stoichiometric equivalent of the amount necessary for reaction with the urea and sulphur dioxide.

The melamine forming reactions are conducted at a temperature within the range of from about 260° C. to about 360° C., and preferably from about 280° C. to about 330° C. The reactions proceed slowly at temperatures below about 280° C. whereas at temperatures above about 330° C. the reactions proceed rapidly but, also, the rate of decomposition of melamine is relatively rapid at these higher temperatures.

The time required for the production of a reasonable yield of melamine varies from several hours at about 260° C. to a few minutes at 360° C. and higher. The retention time within the preferred temperature range, that is, from about 280° C. to about 330° C. may be from 1 to 4 hours.

The yield of melamine under a typical set of operating conditions suitable for continuous operation, that is, at 300° C., 500 pounds per square inch ammonia pressure, 3 hours retention time, a mol ratio of sulphur dioxide to urea of about 1.5:1 and added guanidine sulphamate in the ratio of 0.8 to 2.3 mols per mol urea, is about 45% of the theoretical yield based on the carbon content of the urea and guanidine sulphamate.

The synthesis reaction for the production of melamine is accomplished by passing the selected reactants into a reaction vessel, for example, an autoclave, wherein the above conditions of pressure and temperature are maintained. For convenience, the sulphur dioxide and ammonia are pumped to the autoclave as liquids and the ammonium sulphamate and guanidine sulphamate, if used, are added admixed with molten urea. The low melting temperature of a urea-guanidine sulphamate mixture permits this portion of the charge to be pumped readily in the molten state into the reaction vessel. All the reactants used are as free from moisture as possible.

Preferably, the melamine forming reaction and recovery steps are conducted as a continuous process. The reactants, including ammonia, are passed into a reaction zone, which may be one or more autoclaves, maintained at a temperature of from 280° C. to 330° C. and under a pressure of ammonia of from 500 to 1,000 pounds per square inch. The reaction product is discharged from the reaction zone and passed to a separate cooling or holding vessel wherein it is cooled by evaporation of ammonia. After passing from the cooling vessel through a pressure release vessel where, by the release of ammonia, the pressure is reduced to atmospheric pressure, the reaction product is treated by aqueous extraction methods for the separation and recovery of melamine and of other constitutents, if desired. If sulphur dioxide is used, the process may also include the use of a mixing vessel which acts a a preliminary reaction zone prior to the main reaction zone.

There is a problem in conducting the melamine synthesis. When the melamine forming reaction is conducted at a relatively low temperature, below about 280° C. the reaction proceeds slowly. As the temperature is increased, the reaction proceeds progressively more rapidly but there is an increasing tendency for the melamine to decompose into condensation products such as melam, melem and melon. Also, the reaction mixture is more corrosive at temperatures about 300° C. than at somewhat lower temperatures, necessitating the use of relatively costly corrosion resistant material which may have only a relatively short life.

We have found that the presence in the reaction mixture of at least one compound containing an element of the group phosphorus, arsenic and antimony increases the rate of melamine formation. We can therefore operate the process to produce the desired yield of melamine, which is not necessarily the highest yield possible, at substantially lower temperatures and in shorter periods of time. The addition to the reaction mixture of a finite amount of at least one compound containing an element of the group phosphorus, arsenic and antimony permits operation of the process for melamine production within a temperature range of from about 200° C. to about 360° C. However, the preferred temperature range for conducting the melamine synthesis reaction according to our improved process is from about 240° C. to about 300° C. This temperature range is preferred to avoid, or at least greatly reduce, the corrosive effects of the reaction mixture at temperatures above 300° C. and the decomposition of melamine and formation of undesired condensation products at the higher temperatures, and to take advantage of the improved operating control of the catalyzed reaction possible at the chosen temperature range.

We have found that the catalytic effect of the phosphorus, arsenic and antimony compounds varies somewhat with the temperature at which the synthesis stage of the overall process is conducted and also with the amount of the compound used, although it is evident that a small amount only of the desired compound is necessary. We have further found that the catalytic effect of these phosphorus, arsenic and antimony compounds is appreciable with amounts as small as 0.01% by weight of the total reactant charge. Larger amounts, up to 10% by weight of the charge can be used, but the improved results obtained do not warrent the use of such large amounts and, also, some undesirable insoluble material tends to be formed in the reaction product. An amount of catalyst equivalent to about 0.5% by weight of the total reactant charge is effective over the full range of temperatures used in conducting the synthesis reaction.

The catalytic effect of the presence of a compound of the group phosphorus, arsenic and antimony in the production of melamine has been obtained with the following combinations of reactants; guanidine sulphamate and ammonia; urea, guanidine sulphamate, ammonium sulphamate and ammonia; urea, ammonium sulphamate and ammonia; urea, guanidine sulphamate, sulphur dioxide and ammonia; and urea, sulphur dioxide and ammonia. The catalyst can be added conveniently to the reaction zone admixed with the molten urea, or with the guanidine sulphamate if it is the only reactant apart from ammonia being employed, and can be readily separated from the melamine product in the water extraction method used for separation and recovery of the melamine. No special separation steps are required to remove the catalyst from the reaction product, particularly when amounts in the order of 0.5% by weight are used.

Compounds of the elements phosphorus, arsenic and antimony which contain oxygen have been found to be particularly effective as catalysts for the production of melamine. Such compounds can be, for example, in the form of either the oxides of the elements or the salts of the acids of these elements.

The improved results obtained in the use of the catalysts of the present invention in melamine production are illustrated by the results obtained when heating the various combinations of reactants set out hereinabove. The melamine synthesis reactions can be represented by Equations 1, 2 and 3 above or combinations thereof. Results of tests using a number of different combinations of reactants, catalysts and operation conditions are set out in the following table. The results of tests with uncatalyzed reaction mixtures under exactly the same conditions, except for the catalyst addition, are also set out in the table. The tests were conducted using a superatmospheric pressure of ammonia of about 600 pounds per square inch. The percentage yields of melamine shown are based on the carbon content of the reactants and the percentage of catalyst used is based on the total weight of the reactants.

*Table of test results*

Key to Reaction Mixtures:
A. Guanidine sulphamate and ammonia.
B. Urea (1 mol), guanidine sulphamate (1 mol), ammonium sulphamate (2 mols) and ammonia.
C. Urea (1 mol), ammonium sulphamate (2 mols) and ammonia.
D. Urea (1 mol), sulphur dioxide (3 mols) and ammonia.

| Catalysts | | Reaction Mixture | Conditions | | Melamine Yield, Percent | |
| --- | --- | --- | --- | --- | --- | --- |
| Name | Percent Used | | Temp., °C. | Time, Mins. | Catalyzed | Uncatalyzed |
| Phosphorus pentoxide | 0.5 | A | 276 | 30 | 10.6 | 6.4–7.2 |
| Phosphomolybodic acid | 0.5 | A | 276 | 30 | 8.1 | 6.4–7.2 |
| Ammonium dihydrogen phosphate | 0.5 | C | 240 | 60 | 1.7 | 0.3 |
| Sodium metaphosphate | 0.5 | A | 276 | 30 | 8.7 | 6.4–7.2 |
| Sodium orthophosphate | 0.5 | A | 276 | 30 | 8.0 | 6.4–7.2 |
| Arsenious oxide | 0.01 | A | 300 | 10 | 17.1 | 15.3 |
|  | 0.5 | A | 300 | 10 | 22.1 | 16.3 |
|  | 0.5 | B | 276 | 30 | 21.0 | 4.5 |
|  | 0.5 | D | 300 | 10 | 5.1 | 3.5 |
|  | 10.0 | A | 210 | 120 | 5.0 | 3.3 |
|  | 10.0 | D | 210 | 120 | 3.9 | 0.7 |
| Arsenic oxide | 0.5 | A | 276 | 30 | 13.1 | 6.4–7.2 |
| Sodium arsenite | 0.5 | A | 276 | 30 | 8.7 | 6.4–7.2 |
| Sodium arsenate | 0.5 | A | 276 | 30 | 9.2 | 6.4–7.2 |
| Antimony trioxide | 0.5 | B | 276 | 30 | 10.0 | 4.5 |
| Antimony pentoxide | 0.5 | A | 276 | 30 | 8.4 | 6.4–7.2 |
| Sodium antimonite | 0.5 | A | 276 | 30 | 8.7 | 6.4–7.2 |
| Sodium antimonate | 0.5 | A | 276 | 30 | 8.9 | 6.4–7.2 |
| Boron phosphate | 0.5 | B | 276 | 30 | 11.2 | 4.5 |
| Boron arsenate | 0.5 | B | 276 | 30 | 15.0 | 4.5 |
| Phosphorus pentoxide and boric oxide (Ratio B:P::1:1) | 0.5 | A | 276 | 30 | 19.1 | 6.4–7.2 |
| Arsenious oxide and boric oxide (Ratio B:As::1:1) | 0.5 | A | 276 | 30 | 22.7 | 6.4–7.2 |
| Arsenic oxide and boric oxide (Ratio B:As::1:1) | 0.5 | A | 276 | 30 | 19.0 | 6.4–7.2 |

It will be noted from the above examples that a satisfactory yield of melamine can be obtained within a reasonable period of time, for example, from 10 minutes to 2 hours, when conducting the synthesis reaction at a temperature within the range of from about 240° C. to about 300° C. When operating within this temperature range, the corrosive effect of reaction mixtures and the production of undesired condensation products are substantially reduced. In addition, with the increased rate of the reaction and the consequent reduced time of retention of the reaction mixture in the reaction zone, a smaller reaction vessel can be used, or alternatively, increased production can be obtained without a corresponding increase in the size of the reaction vessel.

It is understood that the term "at least one compound containing an element of the group phosphorus, arsenic and antimony" employed in the appended claims is intended to exclude boron-containing compounds, the use of which as catalysts in melamine synthesis constitutes the invention described and claimed in our co-pending application Serial No. 599,294, filed July 23, 1956.

It will be understood, of course, that modifications can be made in the preferred embodiment of the invention described herein without departing from the scope defined by the appended claims.

What we claim as new and desire to protect by Letters Patent of the United States is:

1. In a process for the production of melamine in which ammonia and at least one group of compounds selected from the groups of compounds consisting of: (a) urea and ammonium sulphamate in the mol ratio of at least 1 mol of ammonium sulphamate per mol of urea, (b) urea and sulphur dioxide in the mol ratio of at least 1.5 mols of sulphur dioxide per mol of urea, and (c) guanidine sulphamate are reacted at a temperature of from about 200° C. to about 360° C. under a superatmospheric pressure of ammonia and a guanidine compound is present in the reaction mixture and guanidine compound is converted to melamine as the reaction proceeds, the improvement which comprises catalyzing the conversion of guanidine compound to melamine by providing in the reaction mixture in amount of from about 0.01% to about 10% by weight of the total reactant charge an oxide of an element selected from the group consisting of phosphorus, arsenic and antimony.

2. The process for the production of melamine according to claim 1 in which the reaction is conducted at a temperature within the range of from about 240° C. to about 300° C.

3. The process for the production of melamine according to claim 1 in which the catalyst is selected from the group consisting of arsenic oxide and arsenious oxide.

4. The process for the production of melamine according to claim 1 in which the catalyst is phosphorus pentoxide.

5. The process for the production of melamine according to claim 1 in which the catalyst is antimony trioxide.

6. In a process for the production of melamine in which ammonia and guanidine sulphamate are reacted at a temperature within the range of from about 200° C. to about 360° C. under a superatmospheric pressure of ammonia, the improvement which comprises catalyzing the conversion of guanidine sulphamate to melamine by providing in the reaction mixture in amount of from about 0.01% to about 10% by weight of the total reactant charge an oxide of an element selected from the group consisting of phosphorus, arsenic and antimony.

7. In a process for the production of melamine in which urea is reacted with ammonia and a member selected from the group consisting of ammonium sulphamate in the mol ratio of at least 1 mol per mol urea and sulphur dioxide in the mol ratio of at least 1.5 mols per mol urea at a temperature within the range of from about 200° C. to about 360° C. under a superatmospheric pressure of ammonia and in which the reactants react to form a guanidine compound in the reaction mixture and guanidine compound is converted to melamine, the improvement which comprises catalyzing the conversion of guanidine compound to melamine by providing in the reaction mixture in amount of from about 0.01% to about 10% by weight of the total reactant charge an oxide of an element selected from the group consisting of phosphorus, arsenic and antimony.

References Cited in the file of this patent

UNITED STATES PATENTS

| | | |
|---|---|---|
| 2,469,338 | Mackay | May 3, 1949 |
| 2,550,659 | Vingee | Apr. 24, 1951 |
| 2,698,344 | Mills et al. | Dec. 28, 1954 |
| 2,776,286 | Lobdell | Jan. 1, 1957 |

FOREIGN PATENTS

| | | |
|---|---|---|
| 1,083,791 | France | Jan. 12, 1955 |
| 527,237 | Germany | June 23, 1931 |
| 836,354 | Germany | Apr. 10, 1952 |
| 653,522 | Great Britain | May 16, 1951 |

OTHER REFERENCES

Sabatier: Catalysis in Organic Chemistry, (Van Nostrand Co. 1923), pp. 246–248.